United States Patent

Yanagi

[11] Patent Number: 5,477,361
[45] Date of Patent: Dec. 19, 1995

[54] LIQUID CRYSTAL DISPLAY DEVICE WITH ELEVATION STOPPERS ON BOTH SIDES OF OPENING IN SEAL

[75] Inventor: Masahiro Yanagi, Kyoto, Japan

[73] Assignee: Rohm Co., Ltd., Kyoto, Japan

[21] Appl. No.: 174,058

[22] Filed: Dec. 28, 1993

[30] Foreign Application Priority Data

Mar. 19, 1993 [JP] Japan .................... 5-60495

[51] Int. Cl.⁶ .................... G02F 1/1339; G02F 1/1333
[52] U.S. Cl. .................... 359/80; 359/83
[58] Field of Search .................... 359/80, 83

[56] References Cited

U.S. PATENT DOCUMENTS

| | | | |
|---|---|---|---|
| 4,610,510 | 9/1986 | Funada et al. | 350/334 |
| 5,150,239 | 9/1992 | Watanabe et al. | 359/80 |
| 5,335,103 | 8/1994 | Kim | 359/80 |

FOREIGN PATENT DOCUMENTS

| | | |
|---|---|---|
| 57-112718 | 7/1982 | Japan . |
| 58-114018 | 7/1983 | Japan . |
| 58-139115 | 8/1983 | Japan . |
| 0192230 | 10/1984 | Japan .................... 359/80 |
| 60-232530 | 11/1985 | Japan . |
| 64-9423 | 1/1989 | Japan . |
| 1-180520 | 7/1989 | Japan . |
| 58-139125 | 8/1993 | Japan . |

Primary Examiner—Anita Pellman Gross
Assistant Examiner—Fetsum Abraham
Attorney, Agent, or Firm—Nikaido, Marmelstein, Murray & Oram

[57] ABSTRACT

Provided is a liquid crystal display device including a pair of transparent substrates opposing each other, and a frame-like shaped sealant layer with an opening which serves as a liquid crystal introduction inlet. The sealant layer is provided between the pair of transparent substrates and around their overall periphery spaced apart by a predetermined distance from the peripheral edge of transparent substrates. The pair of transparent substrates are bonded to each other by the sealant layer so as to be held at a predetermined distance therebetween. A liquid crystal material is sealed in between the pair of transparent substrates, and a pair of liquid-crystal-elevation stoppers respectively formed between the pair of transparent substrates and on both sides of the liquid crystal introduction inlet so as to be coplanar with or squeezing out of (i.e., projected from) the peripheral edge.

15 Claims, 4 Drawing Sheets

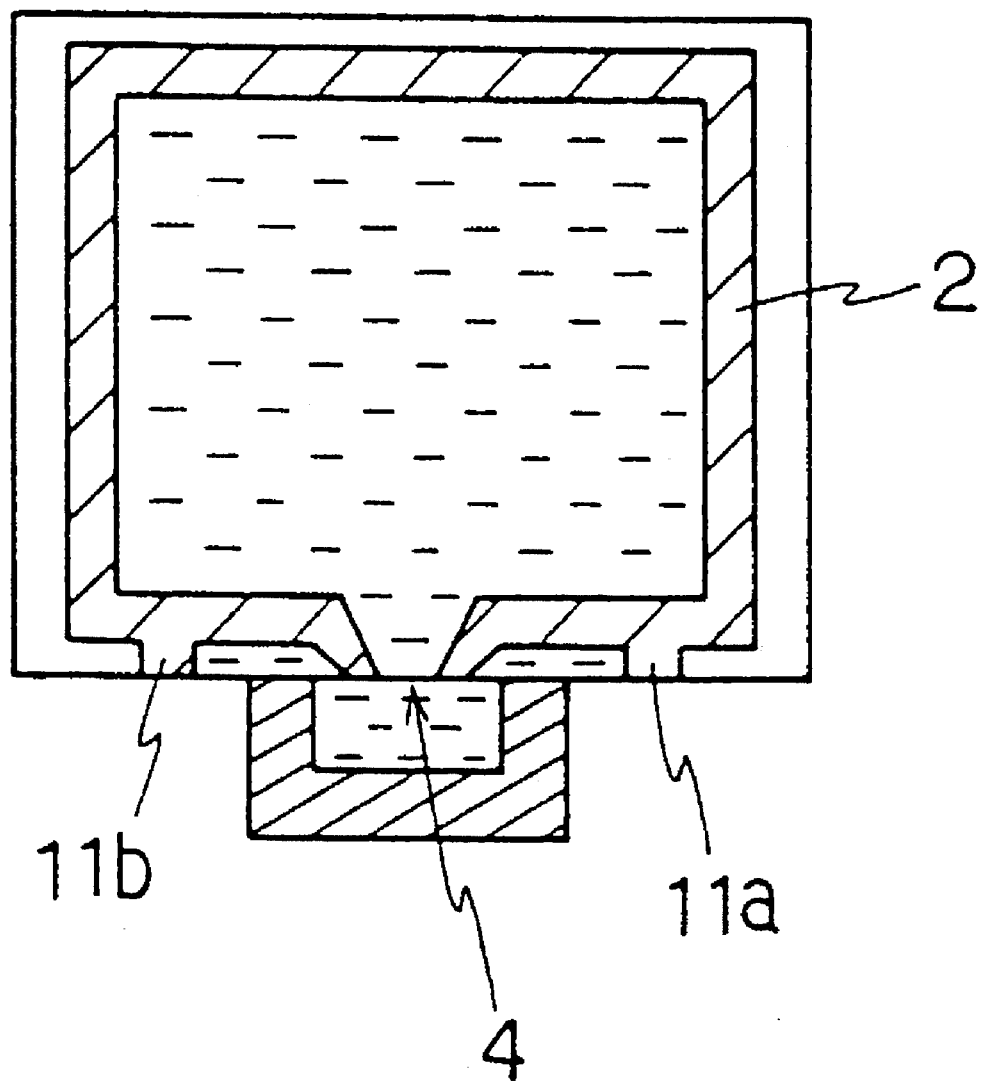

though the sealant layer was printed on each transparent substrate, the layer would not be cut off correctly between its intended part and its protrusion part, or protruded length of the sealant layer

LIQUID CRYSTAL DISPLAY DEVICE WITH ELEVATION STOPPERS ON BOTH SIDES OF OPENING IN SEAL

FIELD OF THE INVENTION

The present invention relates to a liquid crystal display device and, more particularly, to a liquid crystal display device with a sealant layer provided between a pair of transparent substrates of which construction prevents a liquid crystal material from penetrating into the peripheral space outside the sealant layer during the introduction of the liquid crystal material.

BACKGROUND OF THE INVENTION

According to a conventional manner a liquid crystal display panel comprising a liquid crystal material introduced between transparent substrates is constructed as follows:

A frame-like sealant layer is provided on one transparent substrate so as to be spaced apart by a certain distance off the peripheral edge except the part of a liquid crystal introduction inlet. The transparent substrate is bonded to a counterpart transparent substrate by the sealant layer. The resultant structure is evacuated, and then placed on liquid crystal boat 6 filled with liquid crystal material 8 with liquid crystal introduction inlet 4 immersed in the liquid crystal material 8 thereby the liquid crystal material 8 is introduced in between the two substrates 1a and 1b by suction, as shown in FIGS. 3 and 4. Here, FIG. 3 is an explanatory view for exemplifying a manner of introducing a liquid crystal material into a conventional liquid crystal display panel, and FIG. 4 is a sectional view taken along line I—I of FIG. 3.

However, liquid crystal material 8, upon introduction thereof, penetrates even into circumference (peripheral space) 7 outside the sealant layer 2 by capillary action. For this reason, a cleaning operation is required to remove the liquid crystal material left in that space 7 after the introduction. Since the space 7 is very narrow, or as narrow as 5 to 10 μm, the cleaning operation involves difficulty. Moreover, since the use of flon is not permitted recently, the cleaning operation is more difficult. If the liquid crystal material is left in an electrode terminal portion due to incomplete cleaning, the electrode terminal tends to be broken, which leads to a degradation of the reliability of the liquid crystal display device.

In an attempt to prevent the liquid crystal material from penetrating into the peripheral space 7, there is disclosed in Japanese Unexamined Patent Publication No. 180520/1989 a liquid crystal display device provided with liquid-crystal-elevation stoppers 11a and 11b which are, respectively, formed of protrusions of sealant layer 2 in the shape in section and located on the opposite sides of liquid crystal introduction inlet 4 as shown in FIG. 5.

The provision of such penetration stoppers 11a and 11b, however, cannot completely prevent the liquid crystal material from penetrating into the peripheral space defined between the transparent substrates. The liquid crystal material elevates into about 30% of panels with such spaces, resulting in a problem of making defective products. In detail, usually a liquid crystal display panel is produced by printing a plurality of sealant layers and the like on a large glass plate and then cutting the large glass at around each of the sealant layers so as to be cut between adjacent any two sealant layers having a frame-like shape. Thus individual panels are obtained. Hence, even if protrusions of the sealant layer are formed to serve as stoppers, they cannot be made to squeeze out of the peripheral edge of the transparent substrates. In addition, minute unevenness is produced on the surface of the sealant layer to cause the liquid crystal material to elevate onto the surface by capillary action. Thus, the stoppers cannot achieve their purpose.

SUMMARY OF THE INVENTION

It is, therefore, an object of the present invention to provide a liquid crystal display device which is capable of completely preventing a liquid crystal material from elevating into a circumference space by capillary action during the introduction thereof and, thereby, eliminating a cleaning method from the production procedure.

According to one aspect of the present invention, there is provided a liquid crystal display device comprising:

a pair of transparent substrates, a sealant layer provided between the substrates to give spacing by a predetermined distance, an opening formed in a part of the sealant layer, a liquid crystal material introduced through the opening into the spacing, a pair of liquid-crystal-elevation stoppers provided on both sides of the opening and on the outer side of the sealant layer between the substrates, and an opening-sealing member formed at and in the vicinity of the opening to seal the liquid crystal material within the spacing between the substrates.

Preferably, the liquid crystal display device further comprises sealant stoppers formed on opposite sides of the stoppers to the liquid crystal introduction inlet by protruding portions of the sealant layer upto the peripheral edge of the pair of transparent substrates.

The pair of liquid-crystal-elevation stoppers preferably squeeze out of the peripheral edge by 0.3 mm or less.

The pair of liquid-crystal-elevation stoppers are preferably composed of a UV-curable resin.

Further, the sealant layer is preferably composed of an epoxy resin.

Preferably, the liquid crystal display device further comprises a sealing member formed over the pair of liquid-crystal-elevation stoppers to seal the liquid crystal introduction inlet.

According to another aspect of the present invention, there is provided a method of manufacturing a liquid crystal display device, comprising the steps of:

(a) preparing a pair of transparent substrates;

(b) providing a sealant layer between the substrates to give spacing by a predetermined distance so as to form an opening in a part of the sealant layers;

(c) introducing a liquid crystal material through the opening into the spacing (d) providing a pair of liquid-crystal-elevation stoppers on both sides of the opening and on the outer side of the sealant layer between the substrates; and (e) forming an opening-sealing member at and in the vicinity of the opening to seal the liquid crystal material within the spacing between the substrates.

Preferably, in the above step (a) a pair of portions of the sealant layer are partially extended to the peripheral edge of the pair of transparent substrates to form a pair of sealant stoppers for preventing elevation of the material and the liquid-crystal-elevation stoppers respectively provided on opposite sides of the liquid crystal introduction inlet.

In the liquid crystal display device of the present invention, the pair of liquid crystal penetration stoppers are formed on both sides of the liquid crystal introduction inlet in the circumference of the substrates so as to be coplanar with or squeeze out of the edge of the substrates. Hence, the liquid crystal material can be completely prevented from elevating by capillary action into the circumference outside the sealant layer.

Further, since a pair of portions of the sealant layer are extended to or beyond the edge of the substrates on opposite sides of the stoppers for preventing from elevating to the liquid crystal introduction inlet, the material of the stoppers can be prevented from elevating through the circumference.

BRIEF DESCRIPTION OF THE DRAWINGS

FIG. 5 is an explanatory sectional view showing an example of a display panel of a prior art liquid crystal display device in which an attempt is made to prevent penetration of a liquid crystal.

DETAILED DESCRIPTION

A liquid crystal display device according to the present invention will now be described by way of one embodiment thereof with reference to the drawings. It should be understood that the present invention will not be limited to the embodiment.

Figure 1:
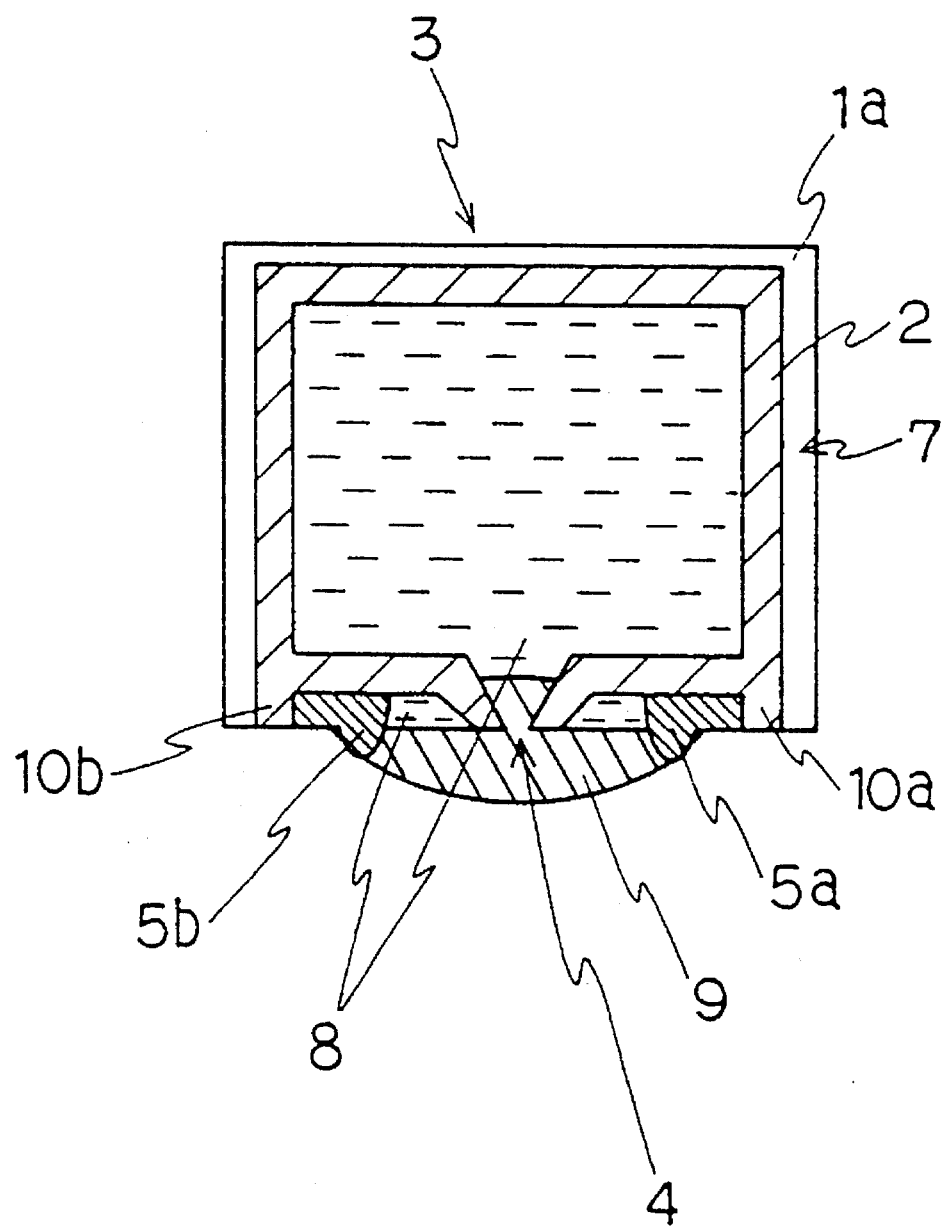
FIG. 1 is an explanatory sectional view showing one embodiment of a liquid crystal display device according to the present invention.
Figure 2A:
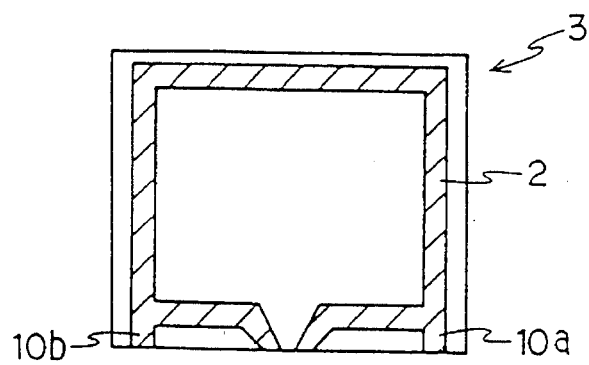
FIGS. 2a through 2c illustrate in section one example of a method for manufacturing liquid crystal display device according to the present invention.
Figure 2B:
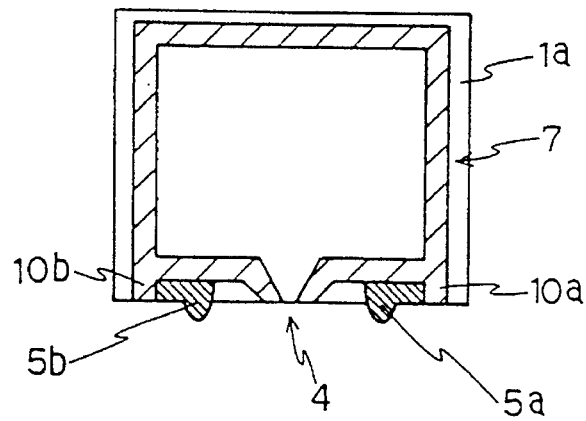
Figure 2C:
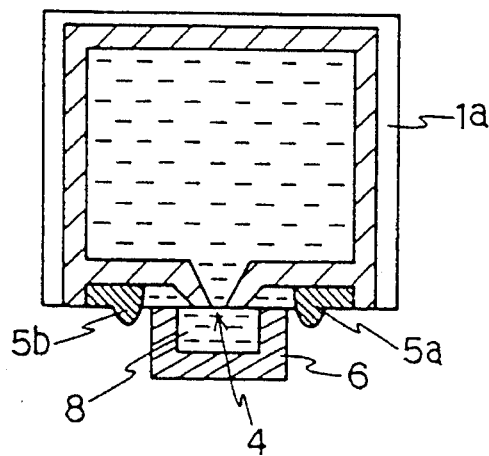
Figure 3:
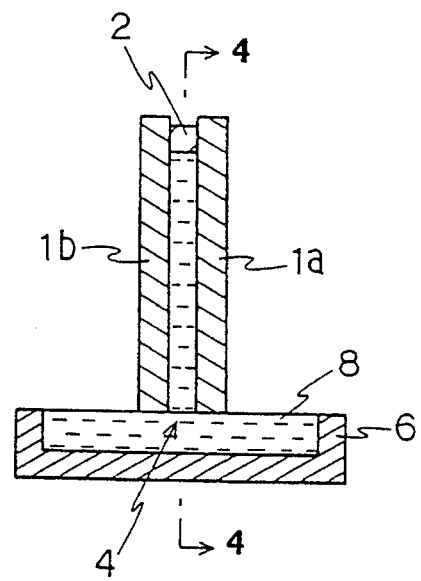
FIG. 3 is an explanatory sectional view for illustrating the manner of introducing a liquid crystal into one example of a prior art liquid crystal display device.
Figure 4:
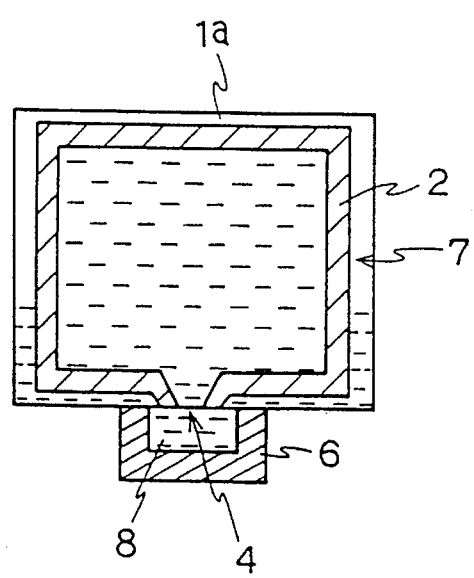
FIG. 4 is a sectional view taken along line I—I of FIG. 3.

Referring to FIGS. 1 and 2, denoted at numeral 1a is a transparent substrate, at numeral 2 a frame-like sealant layer, at numeral 3 a display panel, at numeral 4 a liquid crystal introduction inlet, at numeral 5a, 5b a pair of stoppers for elevating liquid crystal material, at numeral 6 a liquid crystal material boat, at numeral 7 a circumference, at numeral 8 a liquid crystal material, at numeral 9 a liquid crystal introduction inlet sealing portion, and at numeral 10a, 10b a pair of sealant stopper.

As shown in FIG. 1, in the liquid crystal display device of the present invention are provided the stoppers 5a and 5b to prevent liquid crystal material 8 from elevating through the circumference 7 (capillary flow into the circumference 7) during the introduction of liquid crystal material 8. Liquid crystal penetration stoppers 5a and 5b are located in the circumference 7 on opposite sides of the liquid crystal introduction inlet 4 so as to be coplanar with or squeeze out of (i.e., project from) the peripheral edge of the transparent substrates. The material of stoppers 5a and 5b may be composed any material which is curable at room temperature, by heating or by irradiation with ultraviolet ray and immiscible with liquid crystal material 8. Examples of such a material include silicone resin, epoxy resin, and UV-curable resin. Among these the UV-curable resin is especially preferable because it enhances the seal reliability and the amount thereof to be applied is easy to control since such a UV-curable resin is also used for liquid crystal introduction inlet sealing member 9.

The size of each of stoppers 5a and 5b can be appropriately selected depending on the size of the intended liquid crystal display device, but the width thereof is preferably about 1 mm. To completely prevent the penetration of liquid crystal material 8, the stoppers 5a and 5b are each made to be coplanar with or squeeze out of the peripheral edge of the transparent substrates. This is because if stoppers 5a and 5b are not formed as such, the liquid crystal material elevates through the space between the edge and the stoppers and, hence, there cannot be achieved the purpose of completely preventing the elevation of the liquid crystal material. Stoppers 5a and 5b are formed of UV-curable resin or the like and, hence, exhibit a smooth surface. Accordingly, if they are made to be coplanar with the edge of the substrates, there is no room that allows the elevation of the liquid crystal material by capillary action and, hence, the above-mentioned purpose can be accomplished. However, for the sake of perfection, it is desired that stoppers 5a and 5b be made to squeeze out of (i.e., project from) the peripheral edge of the substrates. In this case the projecting portions of stoppers 5a and 5b preferably has a length of about 0.3 mm or less.

Further, sealant stoppers 10a and 10b are respectively provided on opposite sides of the pair of stoppers 5a and 5b to prevent the elevation of the material of the stoppers 5a and 5b. Each of sealant stoppers 10a and 10b is formed by extending sealant layer 2. The provision of sealant stoppers 5a and 5b allows easy positioning of the stoppers 5a and 5b and prevents the material, still uncured, of the stoppers 5a and 5b from elevating into the circumference 7.

To be described next with reference to FIG. 2 is one example of method for manufacturing the liquid crystal display device of the present invention.

First, on a large transparent substrate such as the one made of glass are formed an electrode film and the like, and further a sealant layer such as made of an epoxy resin by printing or a like method. The transparent substrate is registered with and laid on a counterpart transparent substrate. The pair of the substrates are appropriately pressed while heating to cure a sealant layer 2. The pair of transparent substrates is then cut as desired to form a display panel 3 as shown in FIG. 2a. It is noted that in forming the sealant layer 2 sealant stoppers 10a and 10b are formed by extending portions of the sealant layer 2.

Then, as shown in FIG. 2b, a UV-curable resin or the like is made to attach to portions between liquid crystal introduction inlet 4 lying on a side of the pair of substrates and the pair of stoppers 10a and 10b by application using a dispenser, screen printing or transfer printing. At this time the amount of the stopper material, such as UV-curable resin, to be applied is adjusted so that the stoppers 5a and 5b would project over the peripheral edge of the transparent substrate 1a. It is noted that the stoppers 10a and 10b prevent the stopper material from elevating into the circumference 7.

The pair of two bonded transparent substrates is placed in a vacuum chamber to evacuate the clearance defined between the substrates, and then placed on liquid crystal material boat 6 to introduce liquid crystal material 8 into the clearance through liquid crystal introduction inlet 4. In this case the pair of substrates is placed on liquid crystal material boat 6 so that the stoppers 5a and 5b would be positioned outside boat 6 to prevent the elevation of the liquid crystal material.

Finally, as shown in FIG. 1, after the introduction of the liquid crystal material is completed, liquid crystal introduction inlet sealing member 9 is applied to cover the liquid crystal material 8 remaining in the clearance between liquid crystal introduction inlet 4 and the stoppers 5a and 5b, and then cured to seal liquid crystal introduction inlet 4. There-after, necessary components such as polarizers and backlight are provided to the resulting structure to form a liquid crystal display device.

It should be understood that although the stoppers 5a and 5b are covered with liquid crystal introduction inlet sealing member 9 in FIG. 1, they need not necessarily be covered unless the appearance of the device is taken into consideration.

In the present invention sealant stoppers 10a and 10b are formed as extending to the peripheral edge of the transparent substrate upon formation of sealant layer 2. Hence, the liquid-crystal-elevation stopper resin can be applied to form stoppers 5a and 5b without elevating into the circumference. Further, stoppers 5a and 5b are made to be coplanar with or project over the peripheral edge of the transparent substrates and has a smooth surface. The elevation of the liquid crystal material can, hence, be prevented completely during the introduction of the liquid crystal material.

In corroboration of the effects of the present invention, the following four types of liquid crystal display devices were constructed:

1. devices not provided with the liquid-crystal-elevatione sealant stoppers;
2. devices provided with the sealant stoppers only;
3. devices provided with the liquid-crystal-elevation stoppers only; and
4. devices provided with both the sealant stoppers and the liquid-crystal-elevation stoppers. The above liquid crystal display devices were measured for the rate of occurrence of elevation of the liquid crystal material into the circumference. The results of the measurement were as shown in Table 1.

TABLE 1

| Type of stopper | Rate of occurrence of elevation of liquid crystal material | Remark |
| --- | --- | --- |
| 1. No provision of stopper | 100% | |
| 2. Sealant stopper | about 50 – about 70% | |
| 3. Liquid crystal elevation stopper | 0% | 5% of devices allowed elevation of UV-curable resin |
| 4. Sealant stopper together with liquid crystal elevation stopper | 0% | |

As understood from Table 1, with the liquid crystal display device of the present invention provided with both the liquid-crystal-elevation stoppers and the sealant stoppers, the elevation of the liquid crystal material as well as of the UV-curable resin was completely prevented, while about 50% or more of the devices 2 provided only with the seant stoppers allowed the elevation of the liquid crystal material. Further, in 5% of the devices 3 provided only with the stoppers, the elevation of the stopper material occurred.

According to the liquid crystal display device of the present invention, as has been described, there can be completely prevented the elevation of a liquid crystal material into a peripheral clearance between the pair of transparent substrates during the introduction of the liquid crystal material, with the stopper material also prevented from elevating into the peripheral clearance during the formation of the stoppers.

As a result, the cleaning method for cleaning the liquid crystal display device after sealed becomes unnecessary, which leads to a significant reduction in the number of production steps and to an improvement in the reliability of liquid crystal display devices.

Though several embodiments of the present invention are described above, it is to be understood that the present invention is not limited only to the above-mentioned embodiments, and various changes and modifications may be made in the invention without departing from the spirit and scope thereof.

What is claimed is:

1. A liquid crystal display device comprising:
   a pair of transparent substrates,
   a sealant layer provided between the substrates to give spacing by a predetermined distance,
   an opening formed in a part of the sealant layer,
   a liquid crystal material introduced through the opening into the spacing,
   a pair of liquid-crystal-elevation stoppers provided on both sides of the opening and on an outer side of the sealant layer between the substrates, said stoppers including a different member than said sealant layer, and
   an opening-sealing member formed at and in a vicinity of the opening to seal the liquid crystal material within the spacing between the substrates.

2. The liquid crystal display device of claim 1, further comprising sealant stoppers respectively positioned on opposite sides of said liquid-crystal-elevation stoppers to said opening, the sealant stoppers being portions of said sealant layer extended up to a peripheral edge of said pair of transparent substrates.

3. The liquid crystal display device of claim 2, wherein said pair of liquid-crystal-elevation stoppers projected from said peripheral edge by 0.3 mm or less.

4. The liquid crystal display device of claim 2, wherein said pair of liquid-crystal-elevation stoppers are composed of a UV-curable resin.

5. The liquid crystal display device of claim 2, wherein said sealant layer is composed of an epoxy resin.

6. The liquid crystal display device of claim 1, wherein said pair of liquid-crystal-elevation stoppers projected from a peripheral of an outer side edge of said substrates by 0.3 mm or less.

7. The liquid crystal display device of claim 6, wherein said pair of liquid-crystal-elevation stoppers are composed of a UV-curable resin.

8. The liquid crystal display device of claim 6, wherein said sealant layer is composed of an epoxy resin.

9. The liquid crystal display device of claim 1, wherein said pair of liquid-crystal-elevation stoppers are composed of a UV-curable resin.

10. The liquid crystal display device of claim 9, wherein said sealant layer is composed of an epoxy resin.

11. The liquid crystal display device of claim 1, wherein said sealant layer is composed of an epoxy resin.

12. The liquid crystal display device of claim 1, further comprising a sealing member formed over said pair of liquid-crystal-elevation stoppers, to seal said liquid crystal introduction inlet.

13. A method of manufacturing a liquid crystal display device, comprising the steps of:
   (a) preparing a pair of transparent substrates;
   (b) providing a sealant layer between the substrates to give a spacing by a predetermined distance and to form an opening in a part of the sealant layer;

(c) introducing a liquid crystal material through the opening into the spacing;

(d) providing a pair of liquid-crystal-elevation stoppers on both sides of the opening and an outer side of the sealant layer between the substrates; and (e) forming an opening-sealing member at and in a vicinity of the opening to seal the liquid crystal material within the spacing between the substrates.

14. The method of claim 13, wherein a pair of portions of said sealant layer in said step (a) are extended to a peripheral edge of said pair of transparent substrates to form a pair of sealant stoppers for preventing elevation of the material of the pair of liquid-crystal-elevation stoppers respectively positioned on opposite sides of the opening.

15. A liquid crystal display device comprising:

a pair of transparent substrates, a sealant layer provided between the substrates to give spacing by a predetermined distance, an opening formed in a part of the sealant layer, said opening being formed to extend to a peripheral edge of said transparent substrates, a liquid crystal material introduced through the opening into the spacing, a pair of liquid-crystal-elevation stoppers provided on both sides of the opening and on an outer side of the sealant layer between the substrates, said stoppers comprising a different member than said sealant layer, and an opening-sealing member formed at and in a vicinity of the opening to seal the liquid crystal material within the spacing between the substrates.

* * * * *